United States Patent
Li et al.

(10) Patent No.: US 9,858,594 B2
(45) Date of Patent: Jan. 2, 2018

(54) ASSIGNING SCORES TO ELECTRONIC COMMUNICATIONS WITH EXTENSIONS

(71) Applicant: Microsoft Corporation, Redmond, WA (US)

(72) Inventors: Sai-Ming Li, Bellevue, WA (US); Darshan Kantak, Bellevue, WA (US); Sebastien Lahaie, Greenwich, CT (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 477 days.

(21) Appl. No.: 14/319,779

(22) Filed: Jun. 30, 2014

(65) Prior Publication Data
US 2015/0379569 A1 Dec. 31, 2015

(51) Int. Cl.
  *G06Q 30/00* (2012.01)
  *G06Q 30/02* (2012.01)
  *G06F 17/30* (2006.01)

(52) U.S. Cl.
  CPC ..... *G06Q 30/0256* (2013.01); *G06F 17/3053* (2013.01); *G06F 17/3087* (2013.01); *G06F 17/30867* (2013.01); *G06Q 30/0254* (2013.01); *G06Q 30/0275* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 7,958,127 B2* | 6/2011 | Edmonds | G06Q 30/02 707/748 |
| 8,117,050 B2 | 2/2012 | Li et al. | |
| 8,156,007 B1* | 4/2012 | Anthony | G06Q 10/0837 705/22 |
| 8,244,749 B1* | 8/2012 | Das | G06F 17/3097 707/765 |
| 8,271,325 B2 | 9/2012 | Silverman et al. | |
| 8,527,339 B2 | 9/2013 | Gunawardana et al. | |
| 8,635,103 B1 | 1/2014 | West et al. | |
| 9,378,299 B1* | 6/2016 | Rashidi | G06F 17/30899 |

(Continued)

OTHER PUBLICATIONS

"International Preliminary Report on Patentability Issued in PCT Application No. PCT/US2015/037844", dated Aug. 30, 2016, 7 Pages.

(Continued)

*Primary Examiner* — Matthew T Sittner
(74) *Attorney, Agent, or Firm* — Medley, Behrens & Lewis, LLC

(57) ABSTRACT

Various technologies pertaining to conducting auctions for display of electronic communications in display positions are described herein. An electronic communication has a predefined format, and further has an optional extension to the predefined format. The electronic communication participates in an auction, where an auction system takes the extension into consideration when computing a rank score for the electronic communication. Further, the auction system takes historic servings of the electronic communication, with the extension, to client computing devices into account when computing the rank score.

20 Claims, 8 Drawing Sheets

(56) References Cited

U.S. PATENT DOCUMENTS

| | | | |
|---|---|---|---|
| 2002/0091832 A1* | 7/2002 | Low | G06Q 30/02 709/227 |
| 2003/0200168 A1* | 10/2003 | Cullen, III | G06Q 10/06 705/37 |
| 2005/0240865 A1* | 10/2005 | Atkins | G06F 17/217 715/251 |
| 2005/0251444 A1 | 11/2005 | Varian et al. | |
| 2007/0067215 A1 | 3/2007 | Agarwal et al. | |
| 2007/0179945 A1* | 8/2007 | Marston | G06Q 10/107 |
| 2008/0040221 A1* | 2/2008 | Wiseman | G06Q 30/02 705/14.54 |
| 2008/0077402 A1* | 3/2008 | Dhanakshirur | G10L 15/197 704/231 |
| 2009/0089141 A1* | 4/2009 | Lara | G06O 30/0244 705/14.43 |
| 2010/0049695 A2* | 2/2010 | Mr. Morsa | G06Q 30/02 |
| 2010/0070373 A1 | 3/2010 | Zoeter | |
| 2010/0198772 A1* | 8/2010 | Silverman | G06Q 30/02 706/52 |
| 2011/0071908 A1 | 3/2011 | Ghosh et al. | |
| 2011/0145348 A1* | 6/2011 | Benyamin | G06Q 10/10 709/206 |
| 2011/0173063 A1 | 7/2011 | Bhatia et al. | |
| 2011/0191191 A1 | 8/2011 | Bax et al. | |
| 2011/0313967 A1* | 12/2011 | Zafar | G06Q 10/107 706/52 |
| 2012/0191764 A1* | 7/2012 | Leibu | G06Q 30/02 707/821 |
| 2012/0232998 A1* | 9/2012 | Schoen | G06Q 10/10 705/14.66 |
| 2012/0259695 A1* | 10/2012 | Glassman | G06Q 30/0242 705/14.41 |
| 2012/0278162 A1* | 11/2012 | Sun | G06Q 30/0261 705/14.49 |
| 2012/0278180 A1* | 11/2012 | Agarwal | G06Q 30/0269 705/14.71 |
| 2013/0226713 A1 | 8/2013 | Gollapudi et al. | |
| 2013/0227068 A1* | 8/2013 | Yasrebi | H04L 29/06027 709/217 |
| 2014/0081977 A1* | 3/2014 | Kapur | G06Q 30/0269 707/738 |
| 2014/0162741 A1* | 6/2014 | Diskin | A63F 13/005 463/1 |
| 2014/0365318 A1* | 12/2014 | Karande | G06Q 30/0275 705/14.71 |
| 2014/0372203 A1* | 12/2014 | Powell | G06Q 30/0243 705/14.42 |
| 2015/0100528 A1* | 4/2015 | Danson | G06N 5/04 706/21 |
| 2015/0206170 A1* | 7/2015 | Karande | G06Q 30/0242 705/14.41 |
| 2015/0207900 A1* | 7/2015 | Allen | G06F 17/272 709/204 |
| 2015/0356570 A1* | 12/2015 | Goldsmid | G06Q 30/0201 705/7.29 |
| 2015/0379569 A1* | 12/2015 | Li | G06Q 30/0256 705/14.52 |

OTHER PUBLICATIONS

"Written Opinion of the International Preliminary Examining Authority Issued in PCT Application No. PCT/US2015/037844", dated Jun. 7, 2016, 6 Pages.

"Response to the International Search Report (ISR) & Written Opinion Issued in PCT Application No. PCT/US2015/037844", Filed Date: Dec. 30, 2015, 5 Pages.

"International Search Report (ISR) & Written Opinion Issued in PCT Application No. PCT/US2015/037844", dated Sep. 18, 2015, 9 Pages.

Schroedl, et al., "Generalized Utility in Web Search Advertising", In Proceedings of 4th Annual International Workshop on Data Mining and Audience Intelligence for Online Advertising, Jul. 25, 2010, 8 pages.

"Response to the Office Action for Chinese Patent Application No. 201580035379.2", Filed Date: Jun. 23, 2017, 14 pages.

"Response to the Office Action for European Patent Application No. 15736133.8", Filed Date: Jul. 24, 2017, 16 pages.

* cited by examiner

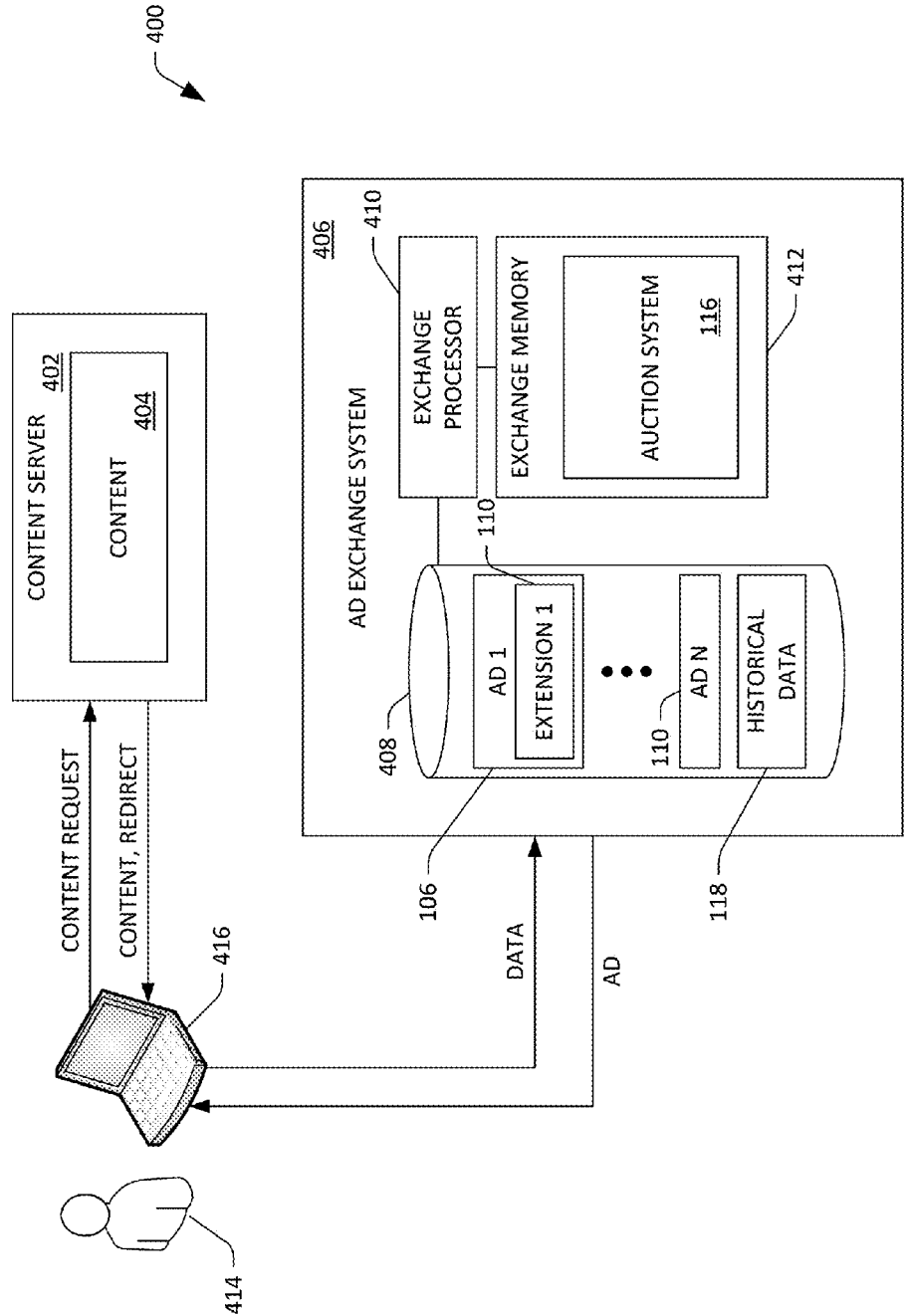

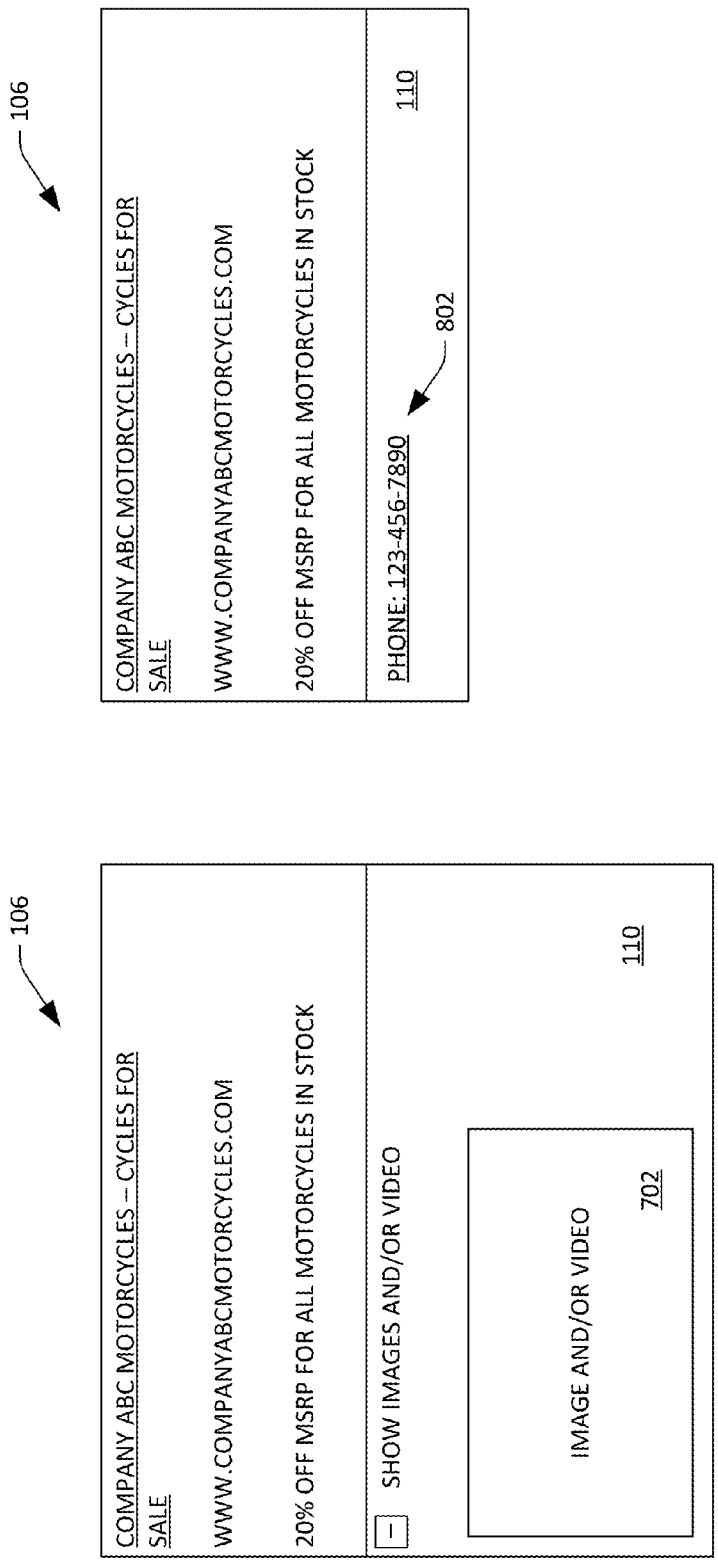

ASSIGNING SCORES TO ELECTRONIC COMMUNICATIONS WITH EXTENSIONS

BACKGROUND

Search engines generate revenue by publishing advertisements that are believed to be relevant to queries set forth by users. Typically, an advertisement is selected for presentment on a search engine results page (SERP) based upon an auction for an advertisement position on the SERP. With more particularity, a search engine receives a query that includes at least one keyword, and advertisers set forth bids for an advertisement position (within which their advertisements can be displayed) based upon the keyword. Thus, each advertisement participating in the auction has a bid value and a click probability value assigned thereto, wherein a click probability is indicative of a probability that a user will select an advertisement if presented in the advertisement position, given that the user has set forth the keyword. The search engine then computes scores for advertisements based upon the bids and click probabilities for the advertisements.

An advertisement that wins the auction is the advertisement that has a highest score assigned thereto from amongst all scores computed for the advertisement position. This winning advertisement is then presented in the advertisement position on the SERP returned to the user. The generalized second price (GSP) auction mechanism is typically used to compute a price to be paid by the advertiser (who manages an ad campaign that includes the advertisement) if the user selects (clicks) the advertisement. The above-described auction mechanism has relied on two fundamental assumptions that pertain to fair selection of advertisements and pricing for advertisements: 1) separability; and 2) independence. Separability refers to the assumption that positional effect on the click probability of an advertisement is able to be modeled as a simple multiplier on a click probability of the advertisement at any specific location. Thus, if a click probability of the advertisement at a first (most prominent) position at the top of the SERP is known, the click probability at any advertisement position can be determined from a known click probability curve. Independence refers to the assumption that the click probability of an advertisement is independent of what is shown around it. These assumptions, however, do not always hold, particularly in view of advertising techniques that are used by some advertisers, but not others.

SUMMARY

The following is a brief summary of subject matter that is described in greater detail herein. This summary is not intended to be limiting as to the scope of the claims.

A computing system is disclosed herein. The computing system includes a processor and a memory, the memory comprises an auction system that is executed by the processor, the auction system configured to compute a score for an electronic communication responsive to receiving an indication that content has been requested by a client computing device, the auction system configured to compute the score based upon the electronic communication having an extension to a predefined format and a historic number of impressions of the electronic communication. The auction system is further configured to cause the electronic communication to be transmitted to the client computing device based upon the score.

BRIEF DESCRIPTION OF THE DRAWINGS

FIG. 4 is a functional block diagram of an exemplary system that facilitates computing scores for electronic communications based upon whether or not such electronic communications have extensions.

FIG. 7 illustrates an exemplary electronic communication having a media extension.

FIG. 8 illustrates an exemplary electronic communication having a telephone extension.

DETAILED DESCRIPTION

Figure 1:
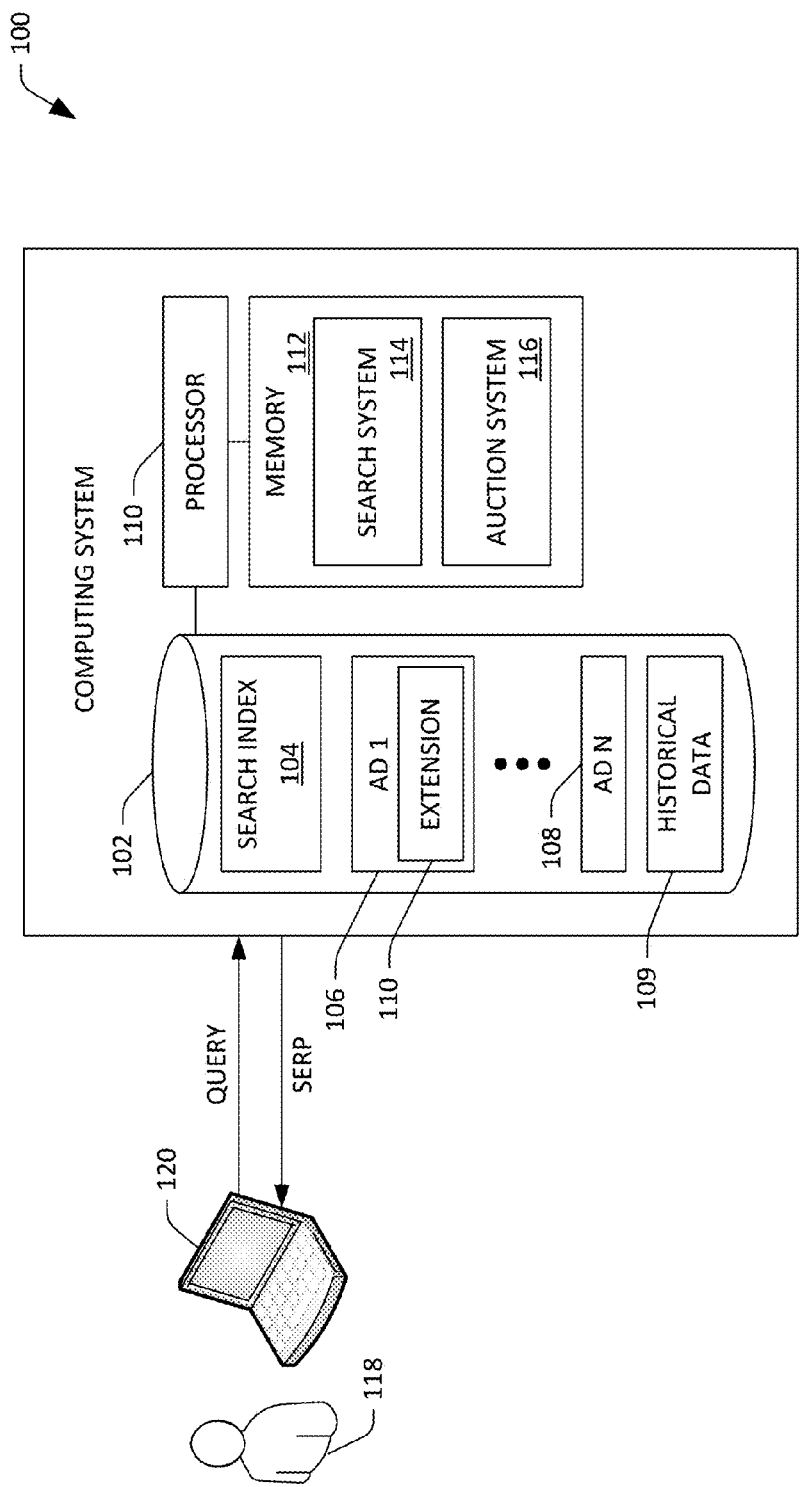
FIG. 1 is a functional block diagram of an exemplary computing system that is configured to compute a score for an electronic communication, the electronic communication having an extension to a predefined format.

Various technologies pertaining to taking extensions into consideration when determining which electronic communications to present on client computing devices are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates computing a score to be assigned to an electronic communication is illustrated. In a non-limiting example, the electronic communication can be an electronic advertisement that is configured for presentment on a display of a client computing device. For example, the advertisement may be a search advertisement that is configured for display on a search engine results page (SERP). In another example, the advertisement may be a display advertisement that is configured for presentment or inclusion on a web page (e.g., a non-search engine webpage) requested by a user of the client computing device. In other examples, the electronic communication may be a message set forth by a user of a social networking application or other suitable electronic communication. Further, the electronic communications can be configured for display on mobile computing devices, such as mobile telephones. In another example, the electronic communications can be configured to display on relatively large display screens, such as those on monitors of desktop computing devices or laptop computing devices.

The computing system 100 includes a data store 102, which can comprise a search index 104. The search index 104, in an example, is an index of web pages accessible by way of the World Wide Web. The search index 104 can additionally or alternatively be an index to application pages that are retrievable by applications other than web browsers, such as games, applications that are configured to present news, etc. The data store 102 can also include a plurality of electronic communications, which are shown in FIG. 1 as being electronic advertisements 106-108. Pursuant to an example, the advertisements 106-108 may have a predefined, standard format, which may be imposed by a search engine that is configured to publish the advertisements 106-108. In an example, each of the advertisements 106-108 having the predefined format may include a title, a uniform resource locator (URL), and a relatively brief description (limited to some threshold number of characters, such as 100). The advertisements 106-108 may further have multiple possible layouts. In an example, the advertisement 106 can have a first layout when presented in line with search results and may have a second layout when presented in a side bar of a SERP (e.g., to the left or right side of search results included in the SERP). Further, the advertisement 106 may have a third layout that is well-suited for presentment on mobile computing devices (e.g., mobile telephones, wearables, etc.), and may have a fourth layout that is well-suited for presentment on larger displays.

Figure 2:
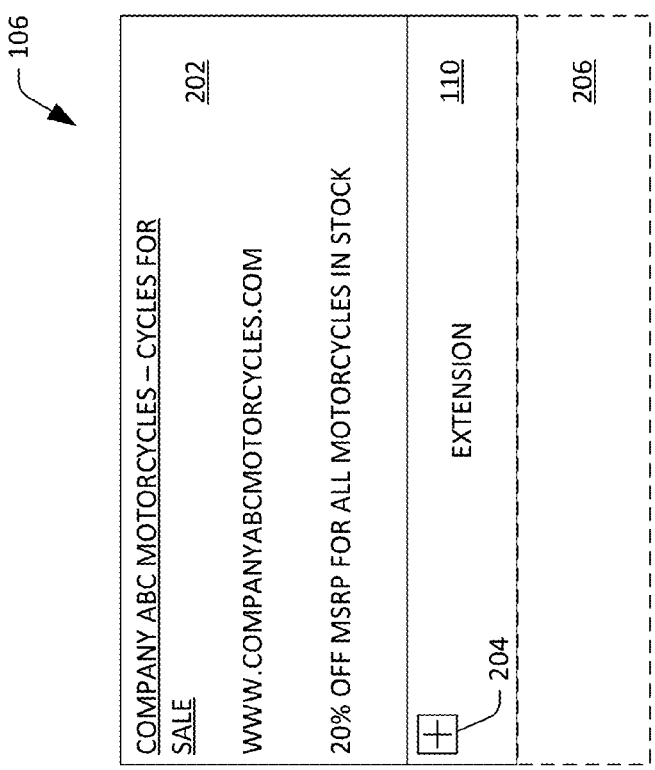
FIG. 2 illustrates an exemplary electronic communication (advertisement) that has an extension.

The advertisement 106 (and possibly other advertisements in the advertisements 106-108) includes an extension 110 to the predefined format. Referring briefly to FIG. 2, an exemplary instantiation of the advertisement 106 is set forth. As indicated above, the advertisement 106 has a predefined format 202, which includes: 1) a title ("COMPANY ABC MOTORCYCLES—CYCLES FOR SALE"); 2) a URL ("WWW.COMPANYABCMOTORCYCLES.COM"); and 3) a relatively brief description ("20% OFF MSRP FOR ALL MOTORCYCLES IN STOCK").

The advertisement 106 also includes the extension 110, which is an extension to the predefined format 202. The extension 110 may optionally include a button 204, such that the extension 110 is expandable to the region 206 shown in dashed line in FIG. 2. Further, the extension 110 may be of a particular extension type from amongst a plurality of potential extension types; exemplary extension types will be described below. Moreover, the extension 110 may have a particular layout from amongst a plurality of potential extension layouts. For example, the extension 110 in FIG. 2 is shown as extending from the bottom of the predefined format 202. In other layouts, the extension 110 may extend from the left side of the predefined format 202, from the right side of the predefined format 202, or from the top of the predefined format 202. Further, the extension 110 may extend diagonally from the predefined format 202, may extend both horizontally and vertically from the predefined format 202, may be offset in some way from the predefined format 202, etc.

It can be ascertained that the extension 110 is optional for the advertisement 106. That is, for example, a search engine (or advertisement exchange or web page) can support the extension 110, but the advertiser who owns the advertisement 106 need not include the extension 110 in the advertisement 106. Studies have indicated, however, that the advertisement 106 may experience more clicks when the extension 110 is included therein. This tends to be mutually beneficial to the advertiser and the search engine, as the advertiser obtains increased exposure to potential customers, and the search engine experiences increased revenue due to advertisers paying on a per-click basis. It can further be ascertained, however, that inclusion of the extension 110 in the advertisement 106 may be to the detriment of other advertisers, particularly those whose advertisements may be positioned at less prominent position when compared to the advertisement 106. Thus, the assumptions of independence and separability may not hold true when advertisements (optionally) include extensions.

Returning to FIG. 1, the data store 102 additionally includes historical data 109, which includes data about historical presentment and/or selection of the advertisements 106-108. For instance, the historical data 109 can include data pertaining to numbers of times that the advertisements 106-108 have been displayed (number of impressions) regardless of whether the advertisements 106-108 had extensions, data pertaining to numbers of times that the advertisements 106-108 were displayed and/or selected at different positions, data pertaining to numbers of times that the advertisements were displayed and/or selected with certain extension types, data pertaining to numbers of times that the advertisements were displayed with certain extension layouts, etc.

The computing system 100 additionally includes a processor 110 and a memory 112 that comprises systems that are executed by the processor 110. With more particularity, the memory 112 includes a search system 114 that is configured to execute searches over the search index 104 responsive to receipt of queries. The memory 112 additionally includes an auction system 116 that conducts auctions for advertisement positions, wherein during execution of auctions, advertisement extensions are contemplated and may influence the outcome of the auctions. Specifically, the auction system 116 conducts auctions based upon the historical data 109.

In an example, the computing system 100 may be or may be included in a search engine system. Accordingly, the computing system 100 may include multiple computing devices in a data center. In another example, the computing system 100 may include two logically separate computing systems, a first computing system that includes the search system 114 and the search index 104, and a second computing system that includes the auction system 116 and the advertisements 106-108. Thus, the architectures of the computing system 100 set forth in FIG. 1 is exemplary in nature and is not intended to be limiting.

Operation of the computing system 100 is now set forth. A user 118 of a client computing device 120 directs an application executing on the client computing device 120 (e.g., a web browser) to a search engine and submits a query to the search engine. The computing system 100 receives the query, and the search system 114 executes a search over the search index 104 based upon the query. The search system 114 identifies a plurality of search results based upon the search, a threshold number of which (e.g., 10) can be presentment on a SERP that is to be output by the computing system 100.

The query transmitted from the client computing device 120 includes at least one keyword, and in this example, the auction system 116 conducts an auction for at least one advertisement position on the SERP based upon the keyword. For instance, the advertisements 106-108 may have bids assigned thereto that are computed by agents or statically assigned for the keyword, and the bids can be received by the auction system 116. As indicated previously, the first advertisement 106 includes the extension 110. The auction system 116 can conduct the auction while taking into consideration that the first advertisement 106 has the extension 110, and further taking into consideration historic display and/or selection of the first advertisement 106 (e.g., with or without the extension 110), which is evidenced in the historical data 109.

With still more particularity, the auction system 116 can compute scores for advertisements that are participating in the auction (e.g., where bids of the advertisements have been received). For instance, the auction system 116 can compute a score for the first advertisement 106 based upon: 1) the first advertisement 106 having the extension 110; and 2) a historic impressions and/or selections of the first advertisement 106 (e.g., at different positions, having different extensions, having different extension layouts) on client computing devices in communication with the computing system 100, as evidenced in the historical data 109. The score assigned to the first advertisement 106 can additionally be based upon the bid of the first advertisement 106 and a probability (pclick) that the user 118 will select the first advertisement 106 when presented on a display of the client computing device 120, given that the user 118 has submitted the query. The auction system 116 selects a winner of the auction based upon the scores, and causes the winning advertisement to be included in the advertisement position in the SERP that is presented on the display of the client computing device 120. For instance, the auction system 116 can determine that the first advertisement 106 has won the auction for the advertisement position, and can cause the first advertisement 106 to be displayed in the advertisement position in the SERP.

In an example, the user 118 may select the first advertisement 106 when presented on the display of the client computing device 120 in the SERP. An indication of the selection is transmitted to the computing system 100, which can charge an account of an advertiser that owns the first advertisement 106 based upon the user 118 selecting the first advertisement 106. Pursuant to an example, a price to charge the advertiser (a cost-per-click) can be based upon historic impressions of the first advertisement 106 on displays of client computing devices and/or historic selections of the first advertisement 106 at client computing devices.

The advertisement position within which the first advertisement 106 is displayed (when winning the auction for the advertisement position) can be at any suitable location in the SERP. For example, the advertisement position can be in-line with the search results identified by the search system 114. Thus, the advertisement 106 can be placed above and in-line with the search results, below and in-line with the search results, or in the middle and in-line with the search results. In another example, the first advertisement 106 may be displayed on a sidebar of the SERP. Further, in many cases, a SERP will include multiple advertisement positions. The auction system 116 can update the historical data 109 based upon position where the first advertisement 106 was displayed, the type of the extension 110, the layout of the extension 110, etc.

Figure 3:
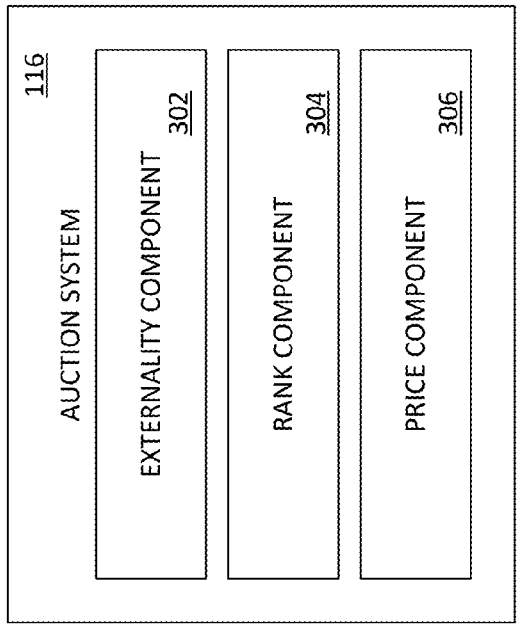
FIG. 3 is a functional block diagram of an exemplary auction system that takes extensions into consideration when conducting auctions.

Now referring to FIG. 3, a functional block diagram of the auction system 116 is illustrated. The auction system 116 includes an externality component 302 that is configured to compute externality scores for advertisements participating in auctions. An externality score is indicative of an externality imposed in an auction setting, wherein the externality is at least partially caused by advertisements having optional extensions. Thus, an externality score for the first advertisement 106, for example, is indicative of an externality imposed by the first advertisement 106 on: 1) other advertisements participating in auctions; and 2) users who are presented with such advertisements. In an example, the externality component 302 can compute externality scores dynamically as advertisements participate in auctions. In another example, the externality component 302 can compute externality scores for advertisements off-line (e.g., periodically or during periods where computational resources are available). For instance, the externality component 302 can compute externality scores for advertisements every two hours, once a day, once a week, etc.

The auction system 116 also includes a rank component 304 that computes scores for advertisements based upon their externality scores. Further, the rank component 304 can compute the scores for the advertisements based upon bids corresponding to the advertisements and click probabilities corresponding to the advertisements. The rank component 304 can rank advertisements according to the scores assigned thereto. For example, the auction system 116 can identify a winning advertisement of an auction based upon the winning advertisement the highest score from among scores assigned to advertisements by the rank component 304.

The auction system 116 can also include a price component 306 that computes costs per-click (CPCs) for advertisements that participate in auctions. In an example, the price component 306 can utilize the generalized second price (GSP) auction mechanism to compute the CPCs. Furthermore, the price component 306 can compute CPCs for advertisements based upon respective externality scores computed by the externality component 302 for the advertisements.

An exemplary operation of the auction system 116 is now set forth. As indicated previously, the user 118 may set forth a query to a search engine, wherein the query is transmitted from the client computing device 120 to the computing system 100. The auction system 116 can conduct a keyword auction for at least one keyword in the query, where the first advertisement 106 may have a bid that is submitted to the auction system 116 responsive to the auction system 116 receiving the keyword. The auction system 116 can access the historical data 109 to review the serving and/or selection history of the first advertisement 106. The externality component 302 can compute an externality score for the advertisement 106 based upon the serving and/or selection history evidenced in the historical data 109. For example, the externality component 302 can compute a relatively high externality score when the advertisement 106 is served with extensions at desirable positions for many impressions on SERPs. Accordingly, if the first advertisement 106 has never been served with an extension in the past, the advertisement 106 will have an externality score of zero, even if the extension 110 now exists in the first advertisement 106.

The externality component 302 can compute the externality score for the first advertisement 106 based upon, for example, a number of times that the first advertisement 106 has historically been displayed on client computing devices and/or clicked at client computing devices. In a more particular example, the externality component 302 can compute the externality score for the first advertisement 106 based upon types of extensions historically included in the advertisement 106, positions where the advertisement 106 was historically served with extensions, historic layouts of the extensions and/or advertisements, etc.

In a non-limiting example, the externality component 302 can compute the externality score for the first advertisement 106 based upon weights assigned to combinations of: 1) advertisement position; 2) extension type; and 3) extension layout. Accordingly, a first weight may be assigned to the combination [Advertisement Position 1; Extension Type 1; Extension Layout 1]; a second weight can be assigned to the combination [Advertisement Position 2; Extension Type 1; Extension Layout 1]; a third weight can be assigned to the combination [Advertisement Position 1; Extension Type 2; Extension Layout 1], and so forth. The weights assigned to the combinations referenced above can be tunable, and may be based upon observations about how users interact with advertisements at different positions with different extension types having different extension layouts.

Using these weights, the externality component 302 can compute a weighted sum of impressions and/or clicks of the first advertisement 106 at the different advertisement position, extension type, and extension layout combinations. In an example, this weighted sum can be computed over some predefined date range, such as a most recent month, a most recent week, etc. The externality component 302 may then normalize the weighted sum based upon a total number of impressions of the advertisement 106. For instance, the total number of impressions of the advertisement 106 may be the number of impressions when the advertisement 106 has an extension. In another example, the total number of impressions of the advertisement 106 may be the total number of impressions regardless of whether the advertisement 106 has an extension. The weights (w) mentioned above can be limited to $0 \leq w \leq 1$. The externality component 302 can further ensure that the externality score is bounded to a particular range by capping a total externality contribution of any advertisement served to some threshold number (e.g., a value of 1 per advertisement impression and/or click). An exemplary algorithm that can be used by the externality component 302 to compute the externality score is shown below:

$$externality = \frac{\sum_{date\ range} \min w_{position,type,layout} \times Imp_{position,type,layout}}{\sum_{date\ range} Imp_{ad}}, \quad (1)$$

where date range is the time range over which the historical data 109 about the first advertisement 106 is filtered, position refers to a position where the first advertisement 106 has been displayed, type refers to an extension type of the first advertisement 106 when displayed, layout refers to the layout of the extension of the first advertisement 106 when displayed, $Imp_{ad}$ refers to an impression of the first advertisement 106. This algorithm ensures that the externality score computed by the externality component 302 is bounded at 1.

As mentioned previously, the rank component 304 can then compute a score for the first advertisement 106 (e.g., a rank score) based upon the externality score. The rank component 304 can also employ a tunable parameter (which can be applied across all advertisements) when computing the score for the first advertisement 106. The tunable parameter ($\beta$) can define an amount of influence the externality score will have on the rank score output by the rank component 304. For example, when initially incorporating externality scores into auctions for advertisement positions, $\beta$ can be selected to cause the externality score to have very little influence on the rank scores used to rank advertisements in the auctions. For instance, $\beta$ can be set relatively low, such that advertisers are not burdened with an immediate change to how the auction system 116 operates. Over time, $\beta$ can be increased such that the externality scores have greater influence on the rank scores computed by the rank component 304. In an example, the rank component 304 can utilize the following algorithm to compute the rank scores that are used to rank advertisements in auctions:

$$RS = bid \times pClick^{\alpha} \times (1 - \beta \times externality) \quad (2)$$

where RS is the rank score, bid is the bid for the advertisement position, $pClick^{\alpha}$ is based upon the click probability for the first advertisement 106 (based upon the keyword), and $0 \leq \beta \leq 1$.

The condition on $\beta$, together with the externality definition set forth in Eq. (1), ensures that the rank score output by the rank component 304 is non-negative and bounded by the rank score that would be output by the rank component 304 if the externality score were not contemplated.

As mentioned previously, the price component 306 can compute CPCs for advertisements based upon their externality scores. For instance, when the first advertisement 106 wins the auction, a cost to be charged to the advertiser that owns the advertisement 106 when the user 118 selects the advertisement 106 is computed. Pursuant to an example, the price component 306 can employ the following algorithm to compute the CPC for advertisements:

$$CPC = \frac{RS_{next}}{pClick^{\alpha} \times (1 - \beta \times externality)}, \quad (3)$$

where $RS_{next}$ is the highest non-winning score.

The auction system 116 has various advantages over conventional auction systems, which fail to contemplate optional extensions. First, when an advertiser modifies an advertisement to include an extension or creates an advertisement with an extension, the advertiser does not perceive an immediate pricing, ranking, or allocation impact, as the externality score for such advertisement (computed by the externality component 302) is zero for the first serving of the advertisement (with the extension) and remains relatively low until the advertisement has been served many times and/or clicked many times. This can reduce the disincentive (from the perspective of advertisers) to adopt extensions.

Second, the impact of the externality score on the rank score can be readily tuned based upon β. For instance, setting β to 0 can cause externality scores to have no impact on rank scores computed by the rank component 304. Over time, β can be (gradually) increased, thereby allowing the externality scores have greater impact on the rank scores output by the rank component 304, but without immediately disturbing the advertisement marketplace. Third, the auctioneer (e.g., a search engine) can recoup a portion of the benefit obtained by advertisers that use extensions. Fourth, use of the externality score "levels the playing field", such that less sophisticated advertisers retain the ability to compete in the marketplace with sophisticated advertisers that use extensions. Fifth, advertisements with extensions that incur significant user cost (take up a large portion of display screen real estate, are distracting, etc.) will have a higher externality score assigned thereto, which may negatively impact the ranking. This can reduce the user cost, as the advertisement will take a less prominent position when presented.

As indicated previously, an exemplary advantage is increased revenue to an auctioneer. An exemplary analysis of revenue impact caused by incorporation of externality scores into rank scores is now provided. The following notation can be set forth for purposes of analysis: i is an advertisement index; j is a position index; t is an extension type and layout index; and d is a date index with beginning and end dates denoted by $\underline{d}$ and $\overline{d}$.

As noted previously, the externality score of advertisement i can be defined as follows:

$$ext_i = \min\left\{ \frac{\sum_{d=\underline{d}}^{\overline{d}} \sum_{j,t} (w_{j,t} \cdot Imp_{i,j,t,d})}{\sum_{d=\underline{d}}^{\overline{d}} \sum_{j,t} (Imp_{i,j,t,d})}, 1 \right\} \quad (4)$$

Here, $w_{j,t}$ is a weight assigned to an advertisement with extension type t at position j, and $Imp_{i,j,t,d}$ is a number of impressions advertisement i received on date d when shown at position j and with extension type t. It can be noted that taking the minimum ensures that $ext \in [0,1]$, but may not be necessary if weights are in [0,1]. The CPC can be computed using GSP.

$b_i$ and $c_i$ can be the bid and click probability of advertisement i, respectively. The rank score computed by the rank component 304 can be as follows:

$$RS_i = b_i \cdot c_i \cdot (1 - \beta \cdot ext_i), \quad (5)$$

where $0 \leq \beta \leq 1$. It can be noted that the rank score is non-negative and bounded above by the original score without considering the externality score.

In an example, it can be assumed that there are two advertisements i=1, 2 and one advertisement position, and that the click probability $c_i$ is the probability of advertisement i getting clicked if shown in the advertisement position. In this example, the keyword auction is a Vickrey auction, such that bids are truthful. Thus, bids equal values per-click and there is no need to be concerned about underlying values and equilibrium revenue.

In this example it can be assumed that $RS_1 > RS_2$. Accordingly, the expected revenue as a function of β is as follows:

$$REV(\beta) = c_1 \cdot CPC_1 = b_2 \cdot c_2 \cdot \frac{1 - \beta ext_2}{1 - \beta ext_1}. \quad (7)$$

It can therefore be found that:

$$\left.\frac{dREV(\beta)}{d\beta}\right|_{\beta=0} = b_2 \cdot c_2 \cdot \left.\frac{ext_1(1 - \beta ext_2) - ext_2(1 - \beta ext_1)}{(1 - \beta ext_1)^2}\right|_{\beta=0} \quad (6)$$
$$= b_2 \cdot c_2 \cdot (ext_1 - ext_2) > 0.$$

This means that expected revenue improves as β is increased from 0 or as the externality score is incorporated into the score computed by the rank component 304.

With reference now to FIG. 4, another exemplary system 400 that facilitates contemplating extensions of advertisements when conducting advertisement auctions is illustrated. In contrast to the system shown in FIG. 1, the system 400 is well-suited for conducting auctions with respect to display advertisements, rather than keyword auctions. The system 400 includes a content server 402 that includes content 404 that can be requested by users. For example, the content 404 may be a web page, such as a blog page, a news page, or the like. In another example, the content 404 may be a video that is desirably viewed, imagery, or other suitable content. The system 400 additionally includes an advertisement exchange system 406, which acts as a broker between advertisers and publishers. In this example, the exchange system 406 includes a data store 408, which is shown as comprising the advertisements 106-108 and the historical data 118. The advertisement exchange system 406 also includes an exchange processor 410 and an exchange memory 412, wherein the exchange memory comprises the auction system 116.

Operation of the system 400 will now be described. A user 414 of a client computing device 416 requests the content 404 on the content server 402. The content server 402 can transmit the content 404 to the client computing device 416, and can further transmit a redirect to an application (e.g., a browser) executing on the client computing device 416. The redirect includes an address corresponding to the advertisement exchange system 406, as well as data that identifies the address of the content 404 requested by the client computing device 416. Responsive to receiving the redirect, the client computing device 416 transmits data to the advertisement exchange system 406. This data can include an identity of the content server 402, a URL of the content 404, as well as information from the client computing device 416 (e.g., cookies).

The advertisement exchange system 406 receives the data from the client computing device 416, and the auction system 116 conducts an auction for an advertisement position included in the content 404. The auction system 116 can operate in a manner similar to that described above, where the auction system 116 selects an advertisement from the advertisements 106-108 based upon rank scores assigned thereto. Rank scores assigned to advertisements by the auction system 116 can be based upon whether the advertisements have extensions and historical data about the advertisements (e.g., a number of times that the advertisement was served with the extension). The advertisement exchange system 406 may then cause a winning advertisement (e.g., the advertisement 106) to be transmitted to the client computing device 416, where the advertisement 106 can be displayed in the content 404. While the advertisement exchange system 406 is shown as directly transmitting the advertisement to the client computing device 416, it is to be understood that the advertisement exchange system 406 may transmit a redirect to the client computing device 416, which directs the client computing device 416 to another network location that retains the advertisement. Thus, for instance, the advertisements 106-108 may not be retained in the advertisement exchange system 406; instead advertisement agents may execute and submit bids for the advertisements (which are retained elsewhere).

Figure 5:
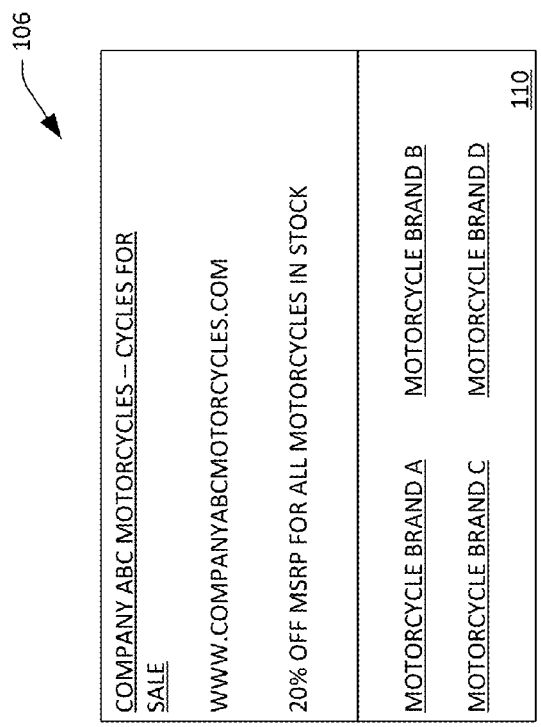
FIG. 5 illustrates an exemplary electronic communication having a link extension.

Referring now to FIG. 5, the exemplary advertisement 106 is illustrated, where the extension is a link-extension. As discussed previously, the advertisement 106 has a predefined format: the title, the URL, and the brief description. The extension 110, when of a link type, includes links to pages of the site represented by the URL. In the example shown in FIG. 5, the extension 110 includes links to pages for respective motorcycle brands. Accordingly, a user, when viewing the advertisement 106, may select one of the links in the extension 110 and be directed to a specific page that is of interest to the user. A number of links in the extension 110, for example, can be between 1 and 10 links. In a particular example, the number of links in the extension 110 can be between 2 and 4 links.

Figure 6:
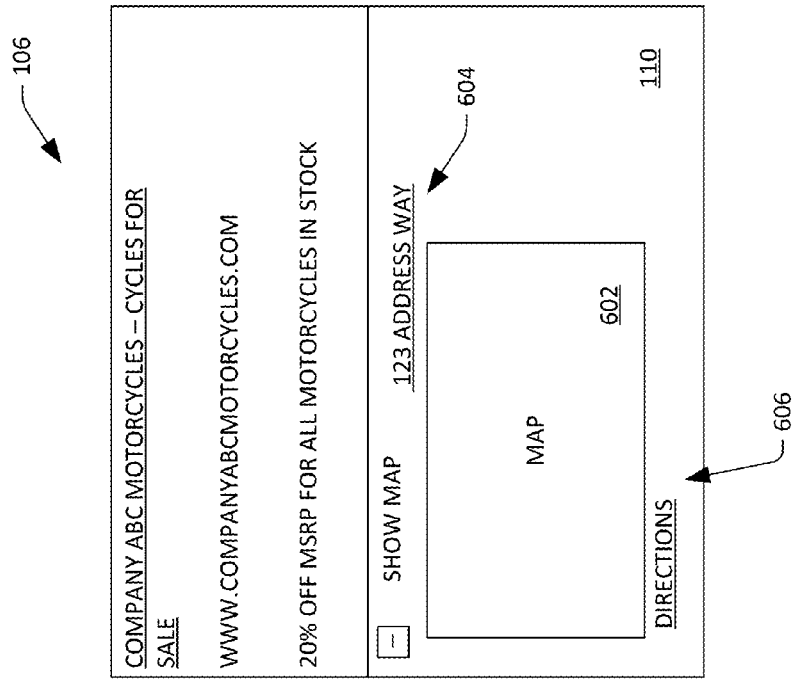
FIG. 6 illustrates an exemplary electronic communication having a location extension.

With reference to FIG. 6, the exemplary advertisement 106 is illustrated, wherein the extension 110 is a location extension. The location extension 110 includes data that is indicative of a location desirably conveyed to an end-user by the advertiser. The data that is indicative of the location may include a map 602. The data that is indicative of the location may additionally or alternatively include an address 604 of the location, where the address may be displayed as a hyperlink. Selection of the hyperlink causes a map to be displayed (e.g., in the extension 110 or on another page). The data that is indicative of the location 110 may also include a directions hyperlink 606 that, when selected, causes directions from a current location of the user (or an entered location of the user) to the above-mentioned location to be displayed (e.g., in the extension 110 or on another page).

Now referring to FIG. 7, the advertisement 106 is illustrated, wherein the extension 110 is a media extension. The media extension 110 includes an image and/or video 702 selected by the advertiser. The image and/or video 702, for example, maybe an image of a product being sold by the advertiser, a video that presents information about products or services offered by the advertiser, or the like. The extension 110 may include multiple images and/or videos. When the image and/or video 702 is a video, the video, for instance, may be playable directly in the extension 110.

Now referring to FIG. 8, the exemplary advertisement 106 is illustrated, wherein the extension of 110 is a telephone extension. The telephone extension can include a telephone number 802 for an advertised business. The telephone number 802, when selected, may cause a telephone application to be executed on a computing device upon which the advertisement 106 is presented. For example, when the advertisement 106 is displayed on a mobile telephone, selection of the telephone number 802 can cause the mobile telephone to dial the telephone number. In another example, a desktop computing device, tablet computing device, or the like may have an application thereon that is configured to make and receive telephone calls. If the computing device does not support telephone calls, the telephone number 802 may not be hyperlinked.

Figure 9:
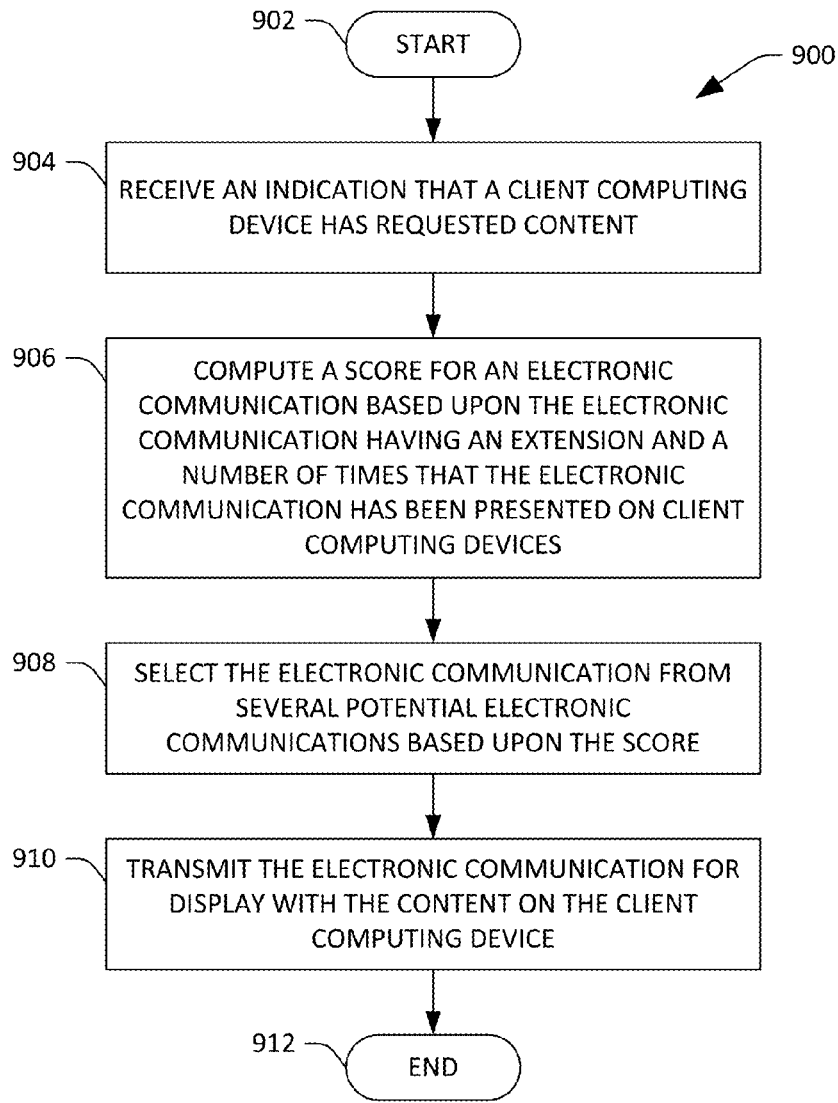
FIG. 9 is a flow diagram illustrating an exemplary methodology for computing a score for an electronic communication based upon the electronic communication having an extension and a number of times that electronic communication has historically been presented on client computing devices.
Figure 10:
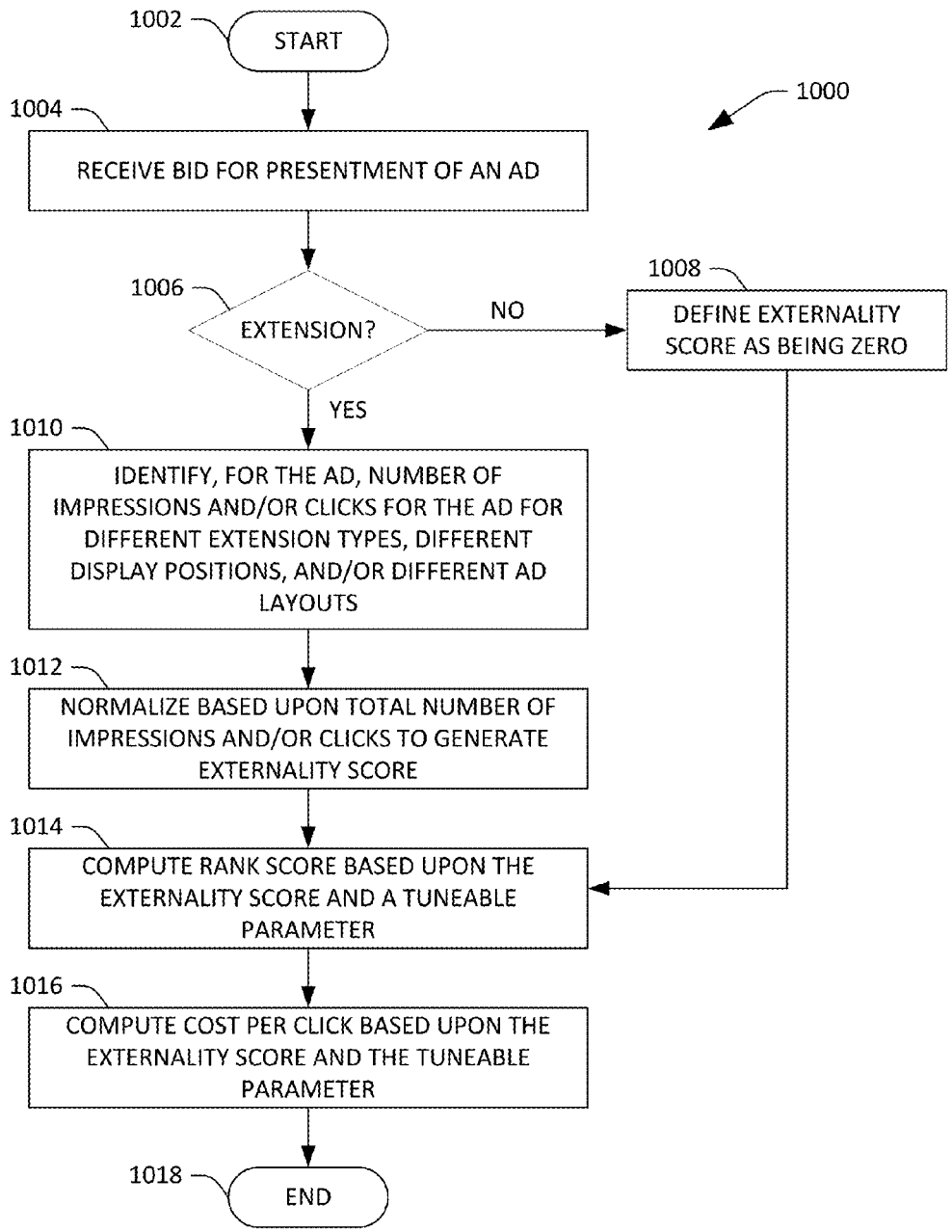
FIG. 10 is a flow diagram illustrating an exemplary methodology for computing a score to assign to an electronic communication based upon the electronic communication having an extension.

FIGS. 9-10 illustrate exemplary methodologies relating to computing rank scores for electronic communications. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 9, an exemplary methodology 900 that facilitates computing a score for an electronic communication based upon the electronic communication having an extension and historic serving and/or clicking of the advertisement is illustrated. The methodology 900 starts at 902, and at 904 an indication is received that a client computing device has requested content. This content may be a SERP, a non-search engine web page, a video, or the like. Receipt of this indication can initiate an auction for an advertisement position to be displayed in or with the content.

At 906, a score for an electronic communication (e.g., an advertisement) is computed based upon the electronic communication having an extension and a number of times at the electronic communication has been presented on client computing devices. For example, the score can be computed by the rank component 304, wherein the score is based upon an externality score computed by the externality component 302 as described above.

At 908, the electronic communication is selected from several potential electronic communications based upon the score computed at 906. That is, the electronic communication can be selected when the electronic communication has the highest score from amongst all scores computed for electronic communications. At 910, the electronic communication is transmitted for display with the content on the client computing device based upon the score computed at 906. The methodology 900 completes at 912.

Turning now to FIG. 10, another exemplary methodology 1000 that facilitates executing an auction for an advertisement position is illustrated. The auction may be a keyword auction or an auction conducted by an advertisement exchange for displaying an advertisement on a position on a webpage. At 1002, the methodology begins, and at 1004 a bid for presentment of an advertisement is received. This bid can be received responsive to receipt of a query that includes a keyword at a search engine. In another example, the bid can be received responsive to receipt of an indication that a client computing device has requested a web page. At 1006, a determination is made regarding whether the advertisement has an extension. Again, as noted previously, the extension is an extension to a predefined format. If, at 1006, it is found that the advertisement does not include an extension, then at 1008, an externality score for the advertisement is set to 0.

If it is determined at 1006 that the advertisement has an extension, then at 1010, a number of impressions and/or clicks for the advertisement for different combinations of advertisement position, extension type, and extension layout are identified. As mentioned previously, these numbers can be identified in real-time as the advertisement submits a bid or off-line and computed periodically. Further, the combinations of advertisement position, extension type, and extension layout may be weighted, and a weighted sum of advertisement impressions and/or clicks can be computed.

At 1012, the weighted sum can be normalized based upon a total number of impressions and/or clicks of the advertisement to generate an externality score. The externality score can be computed by the externality component 302 as described above (e.g., Eq. (1)). Subsequent to 1008 and/or 1012, at 1014 a rank score is computed based upon the externality score and a tunable parameter ($\beta$). The tunable parameter can define an amount of influence the externality score is to have on the rank score. Optionally, at 1016, a CPC of the advertisement can be computed based upon the externality score and the tunable parameter. The methodology 1000 completes 1018.

Various examples are set forth herein.

EXAMPLE 1

A method executed by a processor of a computing device, the method comprising: receiving an indication that a client computing device has requested content; responsive to receiving the indication, computing a score for an electronic communication, the score computed based upon: the electronic communication comprising an extension to a predefined format; and an externality score that is indicative of a number of times that the electronic communication has historically been presented on client computing devices; selecting the electronic communication from several potential electronic communications based upon the score; and responsive to selecting the electronic communication, transmitting the electronic communication for display with the content on the client computing device.

EXAMPLE 2

The method according to example 1, the electronic communication is an electronic advertisement.

EXAMPLE 3

The method according to any of examples 1-2, wherein receiving the indication that the client computing device has requested content comprises receiving a query transmitted to a search engine by the client computing device.

EXAMPLE 4

The method according to any of examples 1-2, wherein receiving the indication that the client computing device has requested content comprises receiving an indication that the client computing device has requested a page from a content server.

EXAMPLE 5

The method according to any of examples 1-4, further comprising computing the externality score for the electronic communication based upon a number of times that the electronic communication has historically been presented on client computing devices.

EXAMPLE 6

The method according to example 5, wherein the electronic communication is an electronic advertisement, the method further comprising: computing a cost per click for the advertisement, the price computed based upon the externality score.

EXAMPLE 7

The method according to any of examples 5-6, wherein the externality score is additionally computed based upon: numbers of times that the electronic communication, having extensions of respective types, have historically been presented on client computing devices; and weights corresponding to the respective types of the extensions.

EXAMPLE 8

The method according to example 7, wherein the externality score is additionally computed based upon: numbers of times that the electronic communication, when displayed at respective positions on pages, have historically been presented on the client computing devices, wherein the weights additionally correspond to the respective positions.

EXAMPLE 9

The method according to any of examples 1-8, wherein the externality score is additionally computed based upon: numbers of times that the electronic communication, when having extensions with different respective layouts, have been historically presented on the client computing devices, wherein the weights additionally correspond to the respective layouts.

EXAMPLE 10

The method according to any of examples 1-9, wherein the score is additionally based upon a tunable parameter, the tunable parameter defines an influence of the externality score on the score.

EXAMPLE 11

The method according to example 1, wherein the electronic communication is an advertisement, the method further comprising: receiving a bid for presenting the advertisement; and computing the score based upon the bid.

EXAMPLE 12

The method according to any of examples 1-11, the extension being at least one of a link extension, a map extension, a media extension, or a telephone extension, the link extension comprises a plurality of links to respective sub-pages of a domain corresponding to the electronic communication, the map extension comprises data indicative of a geographic location corresponding to the electronic communication, the media extension comprises at least one of an image or a video, and the telephone extension comprises a telephone number corresponding to the electronic communication.

EXAMPLE 13

A computing system comprising: a processor; and a memory that comprises an auction system that is executed by the processor, the auction system configured to: compute a score for an electronic communication responsive to receiving an indication that content has been requested by a client computing device, the auction system configured to compute the score based upon the electronic communication having an extension to a predefined format and a historic number of impressions of the electronic communication; and cause the electronic communication to be transmitted to the client computing device based upon the score.

EXAMPLE 14

The computing system according to example 13, the memory further comprises a search system that is configured to receive a query and output a ranked list of search results based upon the query, the indication that the content has been requested by the client computing device is the query being received by the search system.

EXAMPLE 15

The computing system according to any of examples 13-14, wherein the electronic communication is a display advertisement.

EXAMPLE 16

The computing system according to any of examples 13-15, the extension being at least one of a link extension, a map extension, a media extension, or a telephone extension, the link extension comprises a plurality of links to respective sub-pages of a domain corresponding to the electronic communication, the map extension comprises data indicative of a geographic location corresponding to the electronic communication, the media extension comprises at least one of an image or a video, and the telephone extension comprises a telephone number corresponding to the electronic communication.

EXAMPLE 17

The computing system according to any of examples 13-16, the auction system comprises an externality component that is configured to compute an externality score for the electronic communication based upon: the historic number of impressions of the electronic communication, regardless of type of the extension; historic numbers of impressions of the electronic communication for combinations of extension types for the electronic communication, display positions of the electronic communication, and extension layouts; and weights assigned to extension type, display position, and extension layout combinations.

EXAMPLE 18

The computing system according to any of examples 13-17, wherein the auction system is configured to compute the score for the electronic communication based upon a tunable parameter, the tunable parameter defines an influence of the externality score on the score.

EXAMPLE 19

The computing system according to any of examples 13-18, the auction system comprises a rank component that generates a ranked list of electronic communications based upon scores computed for electronic communications in the ranked list, the electronic communication included in the electronic communications, the electronic communication positioned in the ranked list based upon the score assigned to the electronic communication.

EXAMPLE 20

A computer-readable medium comprising instructions that, when executed by a processor, cause the processor to perform acts comprising: receiving a query from a client computing device; generating a ranked list of search results based upon the query; responsive to receiving the query, conducting an auction for an advertisement position on a search engine results page, the search engine results page to include the ranked list of search results, wherein conducting the auction comprises: receiving a bid for an advertisement, the advertisement comprises content that conforms to a predefined format, the advertisement additionally comprises an extension to the predefined format; responsive to receiving the bid for the advertisement, computing a score for the advertisement based upon the advertisement comprising the extension and a number of historic impressions of the advertisement; and determining that the advertisement won the auction based upon the score; and causing the search results page to include the advertisement based upon the auction.

Figure 11:
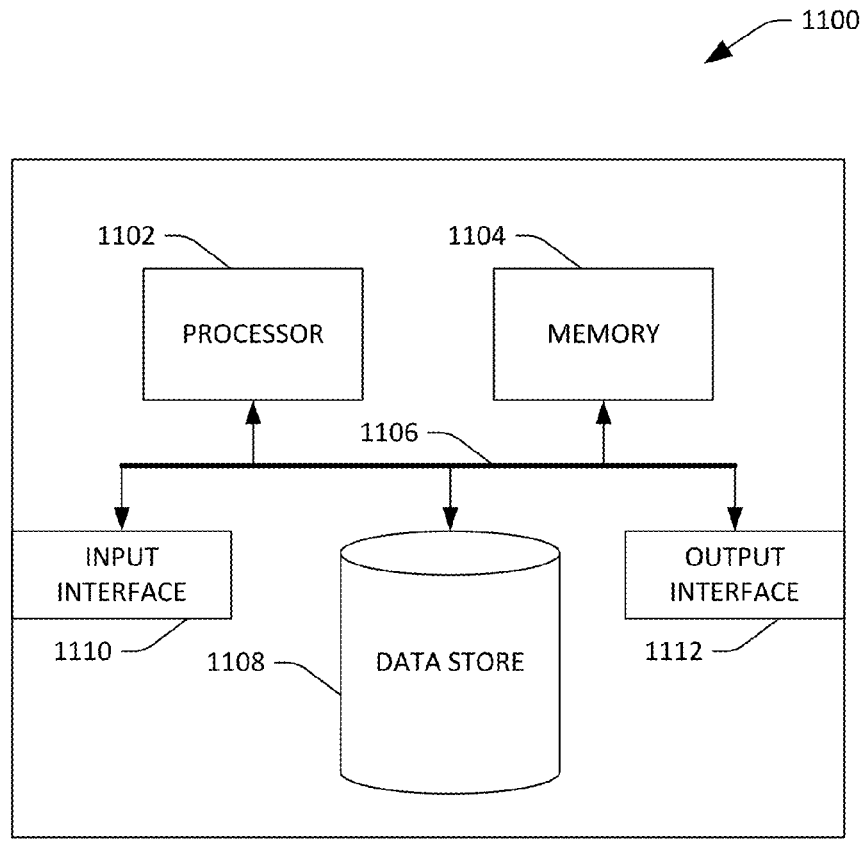
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that is configured to execute keyword auctions. By way of another example, the computing device 1100 can be used in an advertisement exchange system. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store advertisements, bid values, historical data about advertisements with extensions, etc.

The computing device 1100 additionally includes a data store 1108 that is accessible by the processor 1102 by way of the system bus 1106. The data store 1108 may include executable instructions, advertisements, bid values, historical data about advertisements with extensions, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a processor of a computing device, the method comprising:
    receiving an indication that a client computing device has requested content;
    responsive to receiving the indication, computing a score for an electronic communication, the score computed based upon:
        the electronic communication comprising an extension to a predefined format; and
        an externality score that is indicative of:
            a number of times that the electronic communication has historically been presented on client computing devices, wherein the externality score is computed as a function of:
                for each impression of the electronic communication at client computing devices over a defined time range:
                    a position of the electronic communication on a web page;
                    a type of the extension from amongst a plurality of possible types of extensions; and
                    a layout of the extension from amongst a plurality of possible layouts of extensions;
    selecting the electronic communication from several potential electronic communications based upon the score; and
    responsive to selecting the electronic communication, transmitting the electronic communication for display with the content on the client computing device.

2. The method of claim 1, the electronic communication is an electronic advertisement.

3. The method of claim 1, wherein receiving the indication that the client computing device has requested content comprises receiving a query transmitted to a search engine by the client computing device.

4. The method of claim 1, wherein receiving the indication that the client computing device has requested content comprises receiving an indication that the client computing device has requested a page from a content server.

5. The method of claim 1, further comprising computing the externality score.

6. The method of claim 5, wherein the electronic communication is an electronic advertisement, the method further comprising:
    computing a cost per click for the advertisement, the price computed based upon the externality score.

7. The method of claim 5, wherein the externality score is additionally computed based upon weights corresponding to the type of the extension.

8. The method of claim 7, wherein the weights additionally correspond to the position.

9. The method of claim 8, wherein the weights additionally correspond to the layout.

10. The method of 1, wherein the score is additionally based upon a tunable parameter, the tunable parameter defines an influence of the externality score on the score.

11. The method of claim 1, wherein the electronic communication is an advertisement, the method further comprising:
    receiving a bid for presenting the advertisement; and
    computing the score based upon the bid.

12. The method of claim 1, the extension being at least one of a link extension, a map extension, a media extension, or a telephone extension, the link extension comprises a plurality of links to respective sub-pages of a domain corresponding to the electronic communication, the map extension comprises data indicative of a geographic location corresponding to the electronic communication, the media extension comprises at least one of an image or a video, and the telephone extension comprises a telephone number corresponding to the electronic communication.

13. A computing system comprising:
a processor; and
memory storing instructions that, when executed by the processor, cause the processor to perform acts comprising:
   receiving an indication that a client computing device has requested content;
   responsive to receiving the indication, computing a score for an electronic communication, the score computed based upon:
     the electronic communication comprising an extension to a predefined format; and
     an externality score that is indicative of:
       a number of times that the electronic communication has historically been presented on client computing devices, wherein the externality score is computed as a function of:
         for each impression of the electronic communication at client computing devices over a defined time range:
           a position of the electronic communication on a web page;
           a type of the extension from amongst a plurality of possible types of extensions; and
           a layout of the extension from amongst a plurality of possible layouts of extensions;
   selecting the electronic communication from several potential electronic communications based upon the score; and
   responsive to selecting the electronic communication, transmitting the electronic communication for display with the content on the client computing device.

14. The computing system of claim 13, the electronic communication is an electronic advertisement.

15. The computing system of claim 13, wherein receiving the indication that the client computing device has requested content comprises receiving a query transmitted to a search engine by the client computing device.

16. The computing system of claim 13, wherein receiving the indication that the client computing device has requested content comprises receiving an indication that the client computing device has requested a page from a content server.

17. The computing system of claim 13, the acts further comprising computing the externality score.

18. The computing system of claim 17, wherein the electronic communication is an electronic advertisement, the method further comprising:
   computing a cost per click for the advertisement, the price computed based upon the externality score.

19. The computing system of claim 17, wherein the externality score is additionally computed based upon weights corresponding to the type of the extension.

20. A server computing device that is in network communication with a client computing device, the server computing device comprising:
a processor; and
memory storing instructions that, when executed by the processor, cause the processor to perform acts comprising:
   receiving an indication that the client computing device has requested content;
   responsive to receiving the indication, computing a score for an electronic communication, the score computed based upon:
     the electronic communication comprising an extension to a predefined format; and
     an externality score that is indicative of:
       a number of times that the electronic communication has historically been presented on client computing devices, wherein the externality score is computed as a function of:
         for each impression of the electronic communication at client computing devices over a defined time range:
           a position of the electronic communication on a web page;
           a type of the extension from amongst a plurality of possible types of extensions; and
           a layout of the extension from amongst a plurality of possible layouts of extensions;
   selecting the electronic communication from several potential electronic communications based upon the score; and
   responsive to selecting the electronic communication, transmitting the electronic communication for display with the content on the client computing device.

* * * * *